United States Patent [19]
Cleland

[11] Patent Number: 5,191,999
[45] Date of Patent: Mar. 9, 1993

[54] LIQUID ACTUATED SWITCH DEVICE

[76] Inventor: Robert K. Cleland, 11051 Via El Mercado, Los Alamitos, Calif. 90720

[21] Appl. No.: 841,094

[22] Filed: Feb. 25, 1992

[51] Int. Cl.⁵ .............................................. B67D 5/08
[52] U.S. Cl. ...................................... 222/56; 222/64; 222/67
[58] Field of Search .................. 222/56, 64, 67, 129.2, 222/145, 399

[56] References Cited

U.S. PATENT DOCUMENTS

| | | | |
|---|---|---|---|
| 3,394,847 | 7/1968 | Garrard | 222/67 |
| 3,876,107 | 4/1975 | Meindl et al. | 222/64 |
| 3,995,770 | 12/1976 | Schwitlers | 222/56 |
| 4,160,512 | 7/1979 | Cleland | 222/56 |
| 4,544,084 | 10/1985 | Cleland | 222/129.2 |
| 4,560,089 | 12/1985 | McMillin et al. | 222/67 |

OTHER PUBLICATIONS

Cornelius, LR3 Large Reserve Carbonator (Instruction Manual) 1-1 and 4-2, The Cornelius Company 1980-1985.

Primary Examiner—Andres Kashnikow
Assistant Examiner—Philippe Derakshani

[57] ABSTRACT

A liquid actuated switch device including a case that defines an accumulator chamber with upper and lower portions and liquid inlet and outlet openings communicating with the lower portion of the chamber and connected with upstream and downstream sections of flow line delivery, a flow passage through which liquid is forcibly driven, a normally open liquid level actuated switch in the upper portion of the chamber and actuated to close by liquid in the chamber when the level of the liquid in the chamber rises to an actuating level where the pressure on the liquid and on the gases in the upper portion of the chamber are in subsequent equilibrium. The device includes a vent duct extruding between the upper portion of the chamber and the flow passage downstream of the chamber to balance the pressure on the gas in the chamber with the pressure on the liquid downstream thereof.

11 Claims, 4 Drawing Sheets

LIQUID ACTUATED SWITCH DEVICE

BACKGROUND OF THE INVENTION

In the art of blending and/or mixing metered volumes of different liquids, it is often necessary to move or transport liquids from storage vessels, such as liquid supply tanks, through delivery lines such as hoses and/or pipes, from those tanks to remote means and devices that work to meter the flow rate and/or volume of the liquids handled and that thereafter mix those fluids. Further, it is not infrequent that the liquids worked upon are driven or caused to flow from the supply tanks through the delivery lines, to their metering and/or mixing devices, by means of pumps engaged between the tanks and the lines. In other instances, the liquids are moved or driven by the introduction of motive gases, such as $CO_2$, into the supply tanks; which gases displace the liquids in the tanks and drive them downstream therefrom through the lines, as required.

The liquid metering and/or mixing devices that work to meter the driven liquids typically include metering means comprised of flow metering orifice devices and/or adjustable flow metering valves that work to meter the volume of liquid flowing downstream therethrough and on and off valves downstream of the metering means that operating to stop and start the flow of liquid, as desired or as circumstances require.

Typical of the kinds of liquid handling systems and/or machines that work to intermittently caused metered volumes of liquids to flow and to mix together and in which at least one liquid is pumped or gas-driven are carbonated and noncarbonated beverage making and dispensing systems and machines such as are utilized in restaurants and the like to make and dispense beverages. In such systems and machines metered volumes of water and beverage concentrate syrup are intermittently caused to flow and mix together to make desired beverages. The syrups are stored in supply tanks and are pumped and delivered downstream thereof by pumps or, the tanks are charged with gas ($CO_2$) at desired pressure to drive the syrup out of and downstream therefrom. The syrups are driven downstream from the tanks through elongate syrup delivery lines to mixing head assemblies that typically include metering means, valves and the like. The water in such systems and machines is received from pressurized water service systems and is delivered to the mixing head assemblies by means of elongate delivery lines.

In the case of carbonated beverage dispensing systems, the water is suitably carbonated by carbonating units engaged between the water service systems and the mixing head assemblies.

The mixing head assemblies are typically housed within and carried by vertically standing towers that are mounted atop service counters and include on and off valves that are manually controlled to start and stop the flow of liquids and the making of beverages, as desired.

In the case of noncarbonated beverage making and dispensing machines, the machines typically include beverage supply tanks that are suitably supported or mounted atop service counters and from which beverages can be dispensed by means of manually operable dispensing valves on the tanks. Such machines typically include mixing head assemblies at the tops of the beverage tanks to which water and syrup are delivered by means of elongate water and syrup supply lines and that operate to deliver metered volumes of water and syrup into the beverage tanks to make and maintain desired supplies of beverage therein.

The syrup supply tanks used in the above-noted beverage making and dispensing systems and machines are normally positioned in suitable obscure storage places that are remote from the mixing head assemblies and which therefore require that the syrup delivery lines be quite long. The storage places for syrup tanks are often refrigeration rooms located remote from the counters where the machines or towers stand. As a result of the foregoing, the provision and use of syrup delivery lines that are in excess of 100 feet in length are sometimes required.

For effective and efficient use of the above-noted beverage making and dispensing systems and machines and for such use of other equipment of a similar nature, it is necessary that the liquid delivery lines be fully charged or primed with liquids before the systems can be operated to deliver the desired metered volumes of liquids. If the lines are not so primed and the systems are put into operation, they will operate to deliver disproportionate volumes of liquids and produce improperly constituted products until the systems have operated long enough to become properly primed. The foregoing can and often does result in the production of bad or inferior product which is difficult and/or troublesome to deal with and that can and often does result in serious economic losses.

In addition to the foregoing, in equipment or systems where liquids are driven downstream from liquid supply tanks through elongate delivery lines by means of motive gas introduced into the supply tanks, when the supplies of liquids in the tanks are exhausted, the gases continue to flow into and thence downstream from the tanks, into and through the delivery lines to clear those lines of the liquids. This results in the loss of prime and the production of bad product.

To the best of my knowledge and belief, prior to my invention, the prior art has provided no means to effect the filling of the liquid delivery lines and to prime equipment or systems of the character referred to above other than to operate the systems for sufficient periods of time to enable the systems to prime themselves and to endure the losses and inconveniences that are exacted by the production and handling of bad products as the result thereof.

OBJECTS AND FEATURES OF MY INVENTION

It is an object of my invention to provide a novel liquid actuated switching device that is particularly suited to be engaged in a liquid conducting delivery line through which a liquid is normally moved under pressure and that is responsive to the presence and/or absence of that liquid in the line.

It is an object and feature of the invention to provide a switching device of the general character referred to above that is engagable in liquid conducting lines of liquid handling equipment or systems to control electrically operated flow control parts of the systems that occur downstream of the switching device in response to the presence or absence of liquids in those lines.

Yet another object and feature of my invention is to provide a switching device of the general character referred above that is particularly though not exclusively suitable for use in lines through which a liquid is transported or driven by gas at a regulated high operating pressure acting upon the liquid downstream of the device; and, a device that operates in response to the presence and/or absence of the liquid in the line and/or to a drop in the operating pressure on the liquid in the line.

It is yet another object of the invention to provide a switching device of the general character referred to above that is such that its operation is not adversely affected by differentials in pressure on the liquids upstream and downstream thereof or by gas entrained in and carried by liquids flowing therethrough and through its related lines.

It is another object and feature of the invention to provide a switching device of the general character referred to above that includes a case defining an accumulator chamber with upper and lower portions, liquid inlet and outlet openings in the case communicating with the lower portion of the chamber and connected with upstream and downstream sections of a related liquid conducting line and a float-actuated control switch within the upper portion of the chamber and operated to open and close in response to a rise and fall of the level of liquid within the chamber.

It is still another object and feature of my invention is to provide a switching device of the general character referred to above wherein the control switch of the device, for example, a normally open float controlled switch that operates to close when the liquid level in the chamber rises to near that level where the gas within the chamber above the liquid therein is in near equilibrium with an operating pressure on the liquid and that operates to open when the liquid level in the chamber lowers as a result of a reduction or stoppage of the flow of liquid through the chamber or as a result of a drop in the operating pressure on the liquid and a resulting displacement of liquid from within the chamber by the gas in the upper portion thereof.

It is an object and feature of the invention to provide a switching device of the general character referred to above including vent means to equalize the pressure on the gas in the upper portion of the chamber with the pressure on the liquid downstream of the chamber and to vent gas carried by the liquid downstream from the device to the upper portion of the chamber and thereby prevent that gas from flowing back into the chamber in a manner to adversely affect operation of the control switch therein.

A further object and feature of the invention is the provide a switching device of the general character referred to above that includes baffle means in the chamber to eliminate turbulence in the liquid moving through the chamber that might adversely affect operation of the control switch in the chamber.

Finally, it is an object and feature of the invention to provide a switching device of the general character referred above in combination with a fluid handling system including a liquid supply, a liquid delivery line with an upstream section extending downstream from the liquid supply to the switching device and a downstream section extending from the switching device to a flow control means including an electrically operated flow control valve with which the control switch is connected; and, a gas supply directing motive gas at an operating pressure onto the liquid at said liquid supply.

The foregoing and other objects and features of my invention will be apparent and will fully understood from the following detailed description of preferred forms and embodiments of the invention throughout which description reference is made to the accompanying drawings.

DETAILED DESCRIPTION OF THE INVENTION

Figure 1:
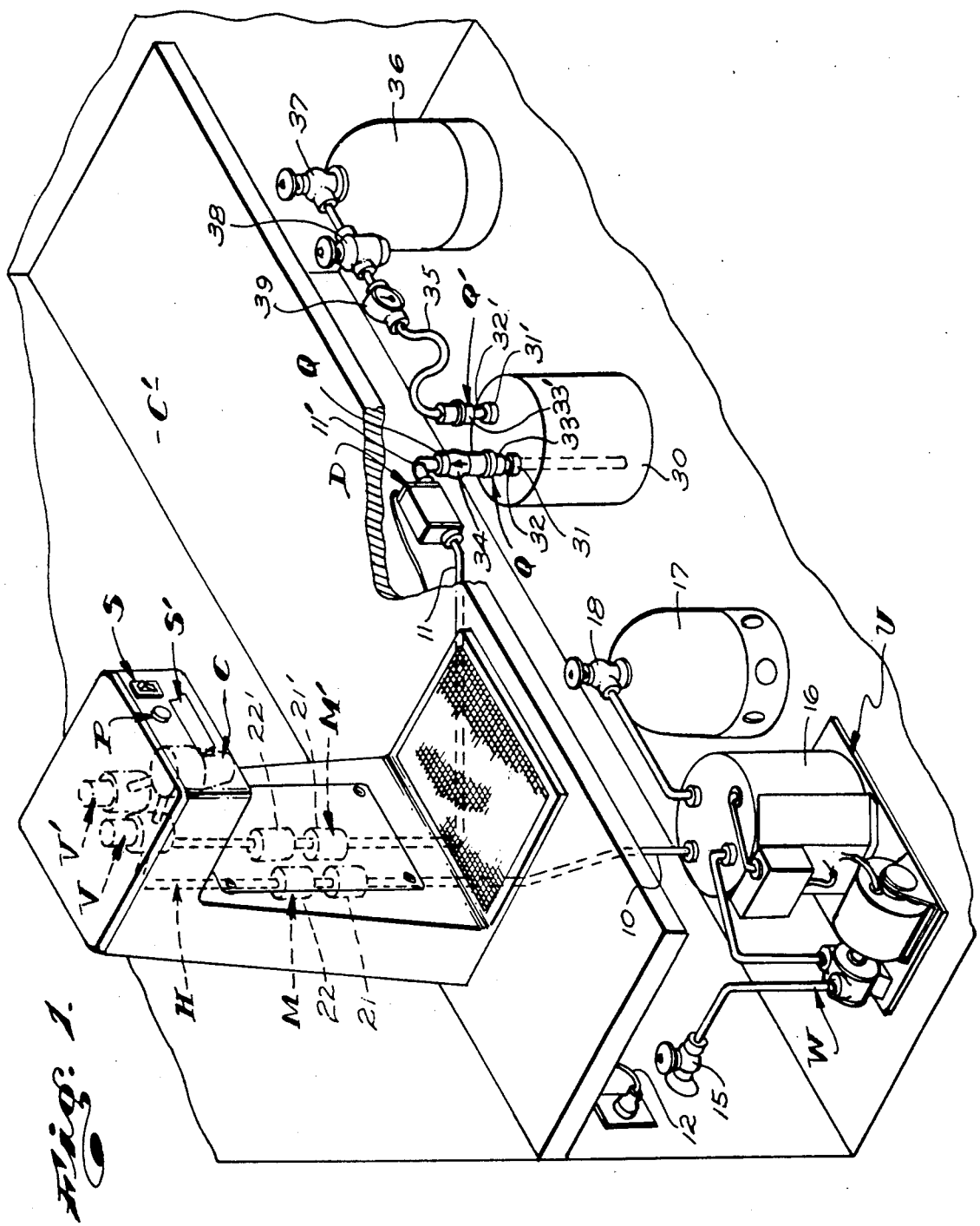
FIG. 1 is an isometric view showing a carbonated beverage supply system that includes my new switching device.

In FIG. 1 of the drawings I have illustrated a carbonated beverage dispensing system with my new liquid-actuated switching device D incorporated in it.

The system includes a drink mixing and dispensing tower T mounted atop and projecting up from a counter C. The tower T carries a mixing head assembly H (shown in dotted lines) including electrically operated, normally closed, water and syrup valves V and V' with outlet sides communicating with a mixing and dispensing cone C below which a drinking glass or the like can be positioned. The upstream or inlet sides of the valves V and V' connect with the downstream ends or sides of water and syrup metering means M and M'. The upstream sides of the metering means M and M' connect with the downstream ends of water and syrup delivery lines 10 and 11.

In addition to the above, the tower T is shown as carrying a manually accessible on-and-off switch S, a manually operable (bar type) beverage dispensing switch S' and a push-button primer switch P. The several switches, the valves V and V' and the device D are connected with a suitable circuit board (not shown) mounted within the tower and which is supplied with operating current through or by means of a service cord 12 that extends to a remote power service outlet. The switch S is operable to put the system into and out of service. The switch S' is normally operable to energize and effect opening of the valves V and V' when it is desired to dispense beverage. The switching device D is connected and operates to disable operation of the system and opening of the valves V and V' when a supply of syrup for delivery to the valve V' is exhausted, as will be explained in the following. The switch P is provided to bypass the device D and to effect energizing and opening of the valve V', to effect priming of the system, as will hereinafter be described.

Figure 2:
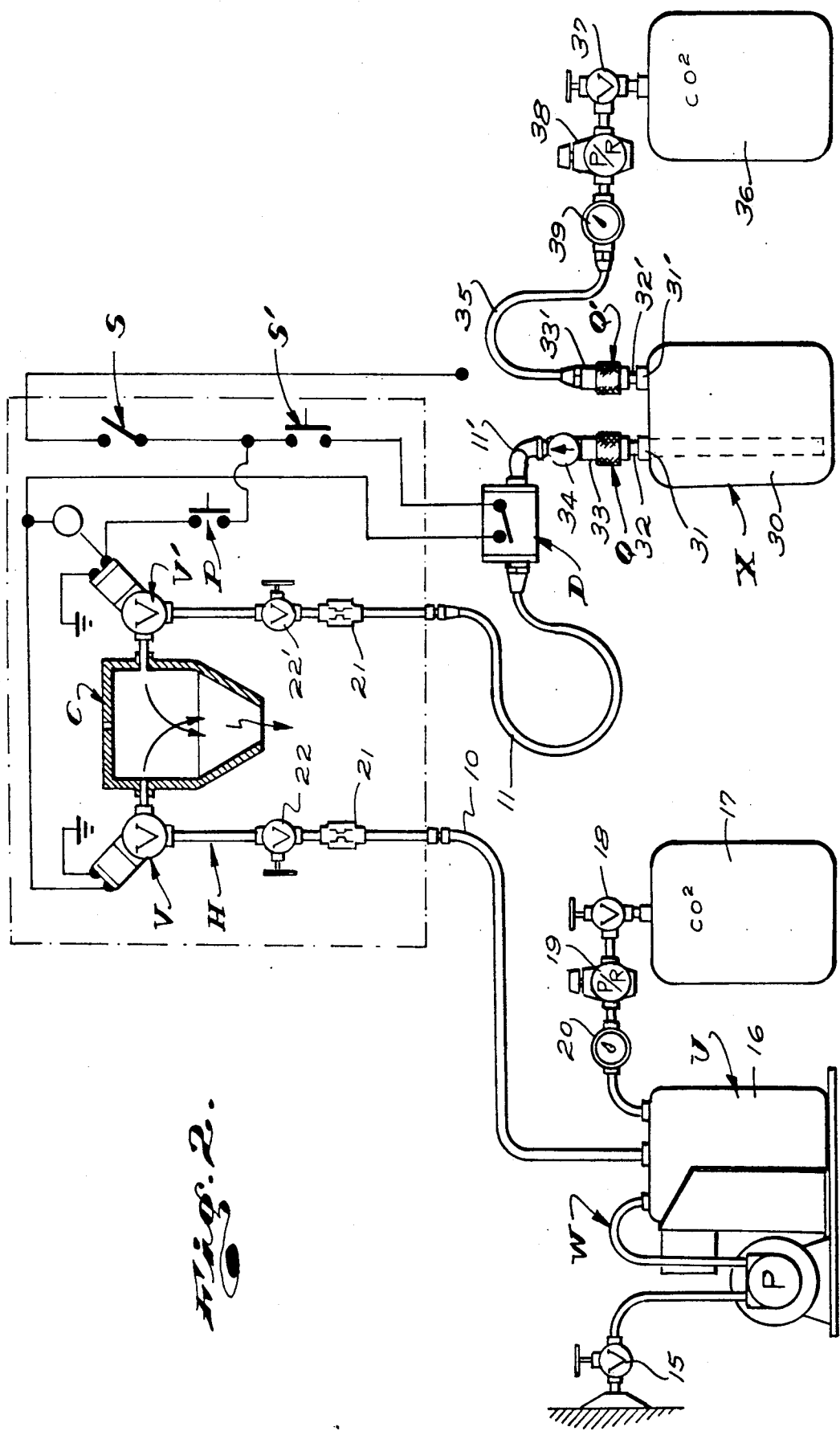
FIG. 2 is a diagrammatic view of the system shown in FIG. 1.

Since the electrical circuitry provided to connect the several electrical components of this system together can vary widely without in any way affecting the novelty of my invention, I have, in FIG. 2 of the drawings, illustrated a very simple circuit and will not burden this disclosure with illustration and detailed description of any one of the more complicated circuits that might be employed in practicing my invention.

The beverage dispensing system illustrated next includes a water supply W to deliver carbonated water to the metering means M and valve V of the head assembly H. The water supply W includes the water supply line 10 and a carbonating unit U. The line 10 has an upstream section the upstream end of which is connected with a hose bib or valve 15 of a pressurized water service system and the downstream end of which is connected with a holding tank 16 of the unit U. The line 10 has a downstream section that is connected with the tank 16 and extends to and connects with the metering means M of the head assembly H.

The water carbonating unit U is shown as including the above-noted tank 16 with which the noted sections of the line 10 connect and a tank or cylinder 17 of $CO_2$ gas that is connected with the tank 16 through a valve 18. In accordance with common practices and as shown in FIG. 2 of the drawings, a pressure regulator 19 and a gauge 20 are preferably engaged between the valve 18 and tank 16.

The carbonating unit U illustrated and described is operable to receive water from the water service system, carbonate that water and deliver it to the head assembly H. In practice, the unit U can include those control means and devices that are commonly used in such carbonating units without in any way departing from the broader aspects and spirit of this invention.

The unit U is a standard piece of equipment such as the LR3 large reserve carbonator produced by the Cornelius Company of Anoka, Minn. The noted carbonator and others like it operate to continuously maintain suitable supplies of carbonated water for use on demand. Such carbonator units are so familiar to those who are skilled in the art that detailed illustration and further description of the unit U need not and will not be provided.

The metering means M is shown as including an orifice metering device 21 with which the line 10 is connected and a manually adjustable metering valve 22 downstream of the device 21 and which is suitably connected with the upstream or inlet side of the electrically operated water valve V.

The system next includes a syrup supply X to supply syrup to the mixing head assembly H. The syrup supply is shown as including a syrup supply tank 30 with a syrup outlet fitting 31 and a gas inlet fitting 32. The fitting 31 connects with and carries a first part 32 of a quick disconnect fitting Q, the second part 33 of which connects with a flexible hose section 11' of the syrup line 11. The second coupling part 33 includes a check valve 34 that prevents backflow through the line 11. The gas inlet fitting 32 of the tank 30 connects with a carries a first part 32' of a quick disconnect fitting Q'. The other or second part 33' of the fitting Q' (which unit includes a check valve) connects with the downstream end of an elongate flexible gas supply hose 35. The upstream end of the hose 35 is connected with a compressed gas cylinder 36 through and by means of a valve 37, pressure regulator 38 and gauge 39, substantially as shown in the drawings.

With the syrup supply illustrated and described above, it will be apparent that motive gas is delivered from the tank 36 into the tank 30 at a desired operating pressure and the gas in the tank 30 displaces and drives syrup in the tank through the syrup supply line 11 to the metering means M' of the mixing head assembly H.

In accordance with common practices, the water supply W and syrup supply X are positioned remote from the counter C and the tower T. In the case illustrate, they are arranged beneath the counter. The distance between the syrup supply X and the mixing head assembly H within the tower T might be such that the syrup delivery line 11 might be only 10 feet in length or might be in excess of 100 feet in length.

It is to be noted that the syrup supply tank 30 holds a discrete volume of syrup and, unlike the water supply W that affords a continuous supply of water, is subject to being periodically emptied or depleted of syrup. When the tank 30 is depleted of syrup, it must be replaced with a full or new tank of syrup.

The most common or standard ratio of water to syrup for making properly constituted beverages is 5-to-1. The most common and convenient to handle and use syrup tanks hold 5 gallons of syrup. Accordingly, where 5-gallon syrup tanks are used in a beverage making and dispensing system, a syrup tank is emptied and must be replaced by a new or full syrup tank every time 25 gallons of beverage is dispensed. The provision and use of the above-noted quick disconnect fittings Q and Q' make the replacement of an emptied syrup tank with a new syrup tank an easy task that can be performed rather rapidly.

In the course of operating the above system, when the supply of syrup in the tank 30 is exhausted, motive gas continues to flow to and thence from the tank into and through the line 11 to the mixing head assembly H. Thus, until it is noted that the supply of syrup has been exhausted, improperly constituted and unmarketable beverage is produced. Further, the syrup supply line 11 and the syrup handling parts of the mixing head assembly are purged or exhausted of all syrup to leave the system unprimed and unable to produce properly constituted beverage. Thereafter, when a new or full tank of syrup is put into use and the system is operated, the system delivers water only from the mixing head until syrup, from the new tank of syrup, has been driven through the line 11 and thence through and from the mixing head assembly H. That is, until the syrup delivery line 11 and the syrup handling parts of the mixing head assembly H are filled with syrup, when the system is first put into operation it first delivers syrup alone. Thereafter, unbalanced volumes of water and syrup are delivered. It is only when the system has operated long enough to effect filling or priming the system with syrup that properly constituted beverage is delivered. Such malfunction of the system is costly of time and material and is extremely inconvenient.

The foregoing sets forth a typical environment in which my new liquid operated switch device D can be and is shown engaged.

The principal function performed by the device D in the system shown is to disable the system and prevent opening of the valves V and V' of the mixing head assembly h when there is no syrup in the syrup supply line. Thus, when the supply of syrup in the tank 30 is exhausted, the device D disables and prevents the system from operating until a new tank of syrup is engaged in the system and the syrup supply line 11 and the mixing head assembly H are once again fully charged or primed with syrup. To enable priming of the system with syrup the above-noted manually operable priming switch P is provided to effect opening of the syrup valve V' of the head assembly H and to thereby allow syrup to be driven from the tank 30 through the line 11 and to the valve V', at which time the device D has been operated to enable the system and allow it to assume full operation.

Figure 3:
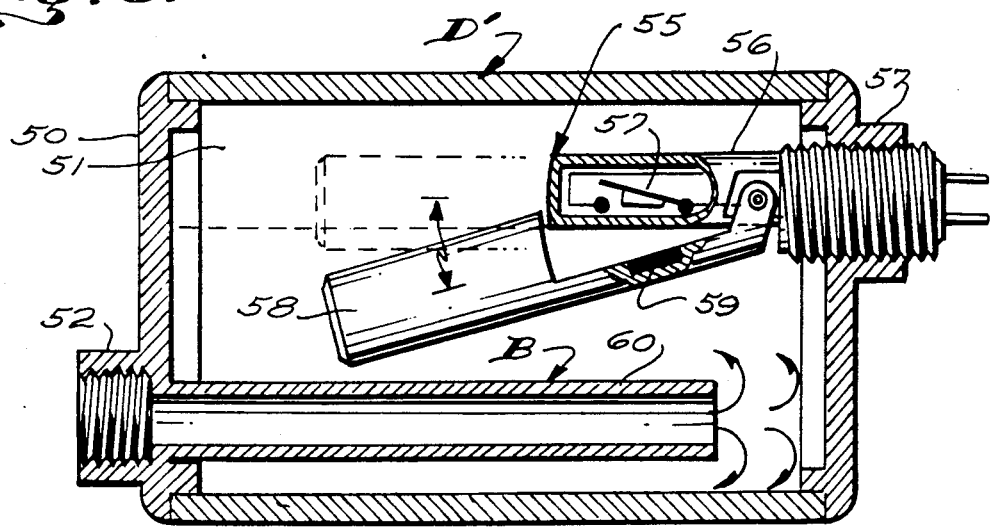
FIG. 3 is an enlarged detailed sectional view of my new switching device, taken substantially as indicated by Line 3—3 on FIG. 1.
Figure 4:
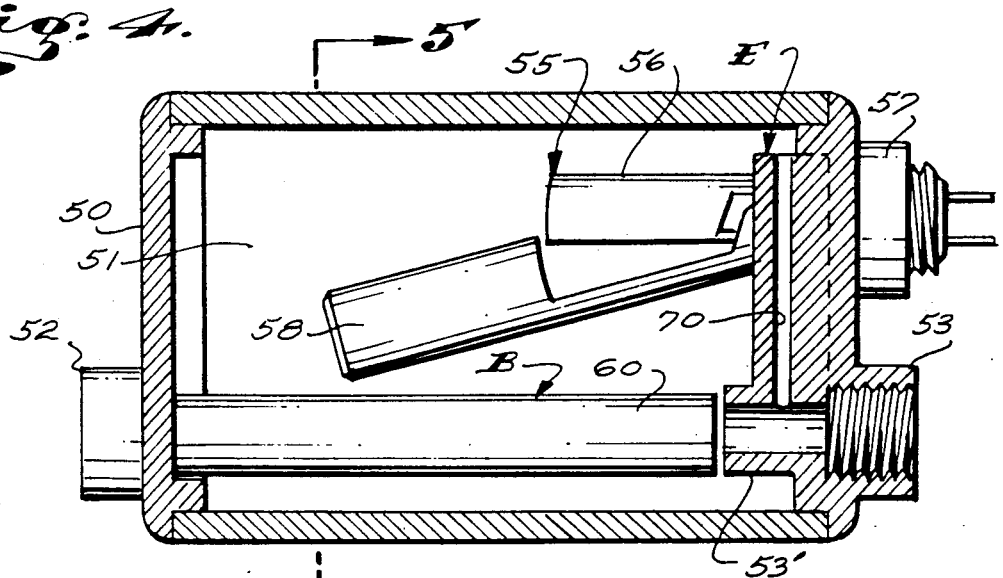
FIG. 4 is a sectional view similar to FIG. 3 taken on a different plane.
Figure 5:
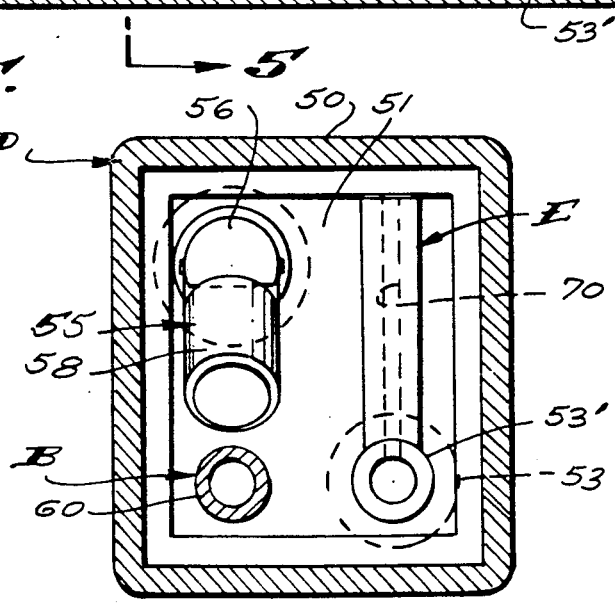
FIG. 5 is a sectional view taken as indicated by Line 5—5 on FIG. 4.

In one preferred embodiment of the invention and as shown in FIGS. 3, 4 and 5 of the drawings, the device D includes a case 50 defining an accumulator chamber 51 normally filled with gas with upper and lower portions. The case 50 has spaced inlet and outlet fittings 52 and 53 that communicate with the lower portion of the chamber 51 and a liquid-actuated or liquid-level actuated control switch unit 55 in the upper portion of the chamber. The switch unit 55 is, for example, a normally open switch unit that remains open when the liquid level in the chamber is below a predetermined operating level and is closed when the liquid level in the chamber rises to or above the operating level. When liquid under pressure is moved into and through the chamber, it rises therein to compress the gas in the upper portion of the chamber. The level of liquid will rise in the chamber until the pressure on the liquid and on the gas in the top of the chamber are in equilibrium, at which time, the rise of liquid in the chamber stops and is stabilized at what will hereinafter be referred to as the operating level.

In practice, the switch unit 55 is positioned and/or adjusted so that it will operate to close only when the liquid in the chamber reaches and is at said operating level or can be positioned and/or adjusted so that it will operate to close when the liquid level in the chamber has risen to an actuating level that is at a predetermined distance below the operating level, as desired or as circumstances require.

In the embodiment of the device now under consideration, the control switch unit 55 is an elongate horizontally disposed float-actuated magnetically operated switch unit that includes an elongate body 56 threadably engaged into and through a mounting tube 57 extending through and carried by a side wall of the case. The body 56 projects inwardly into the chamber 51 and houses a magnetically operated control switch 57 and pivotally supports a float 58 that carries an actuating magnet 59.

The float 58 normally projects inwardly and downwardly from the body 56 and into the upper limits of the lower portion of the chamber 51. The float is pivoted up and down to effect opening and closing of the switch 57 as the liquid level in the chamber rises and falls above and below said actuating level.

The switching unit 55 can be one of several commercially available float-actuated magnetic switch units.

Figure 6:
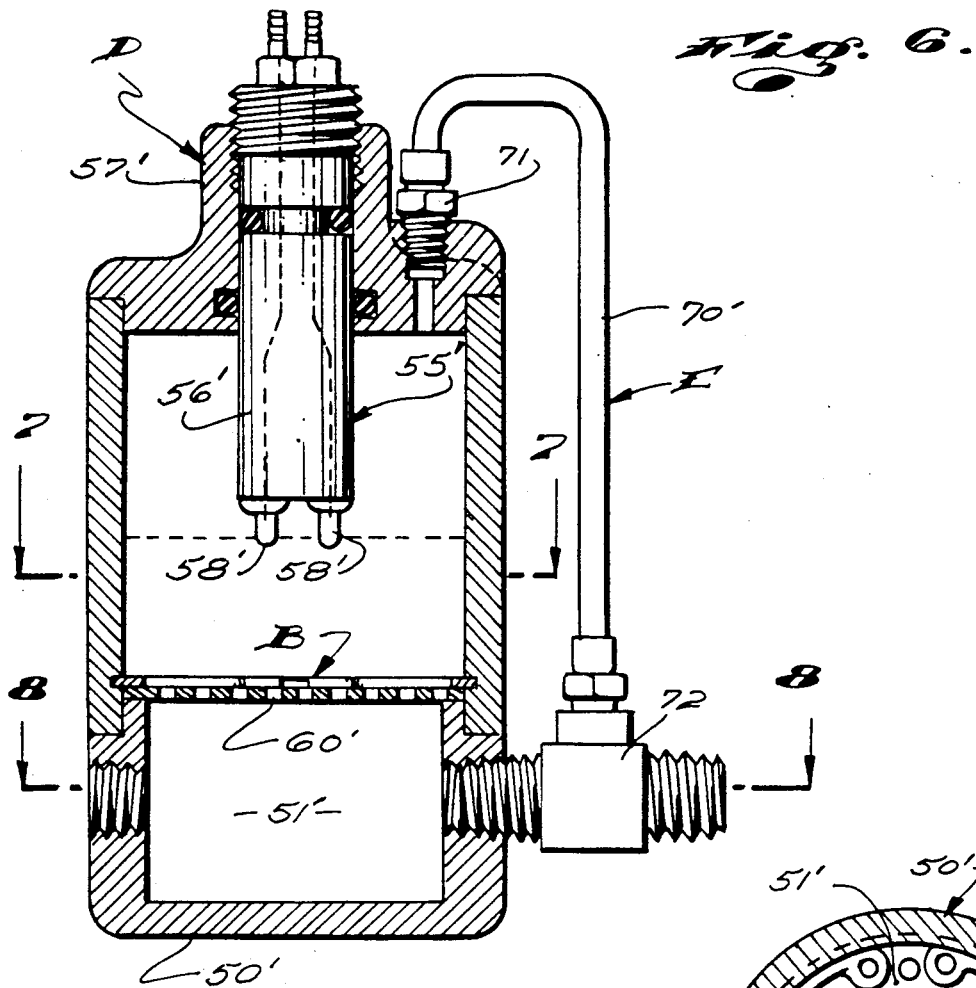
FIG. 6 is a sectional view of another embodiment of my switching device.
Figure 7:
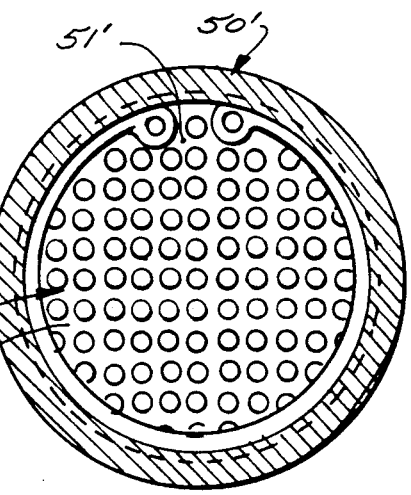
FIG. 7 is a sectional view taken as indicated by Line 7—7 on FIG. 6.
Figure 8:
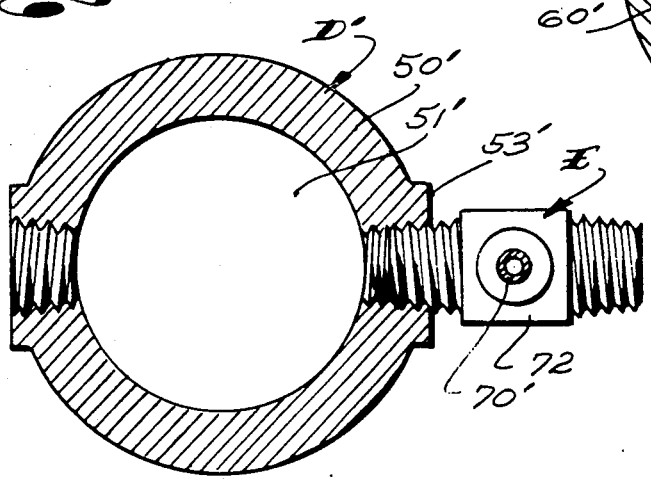
FIG. 8 is a sectional view taken as indicated by Line 8—8 on FIG. 6.

In FIGS. 6, 7 and 8 of the drawings, I have shown another form or embodiment D' of my invention wherein the control switch unit 55' is a probe-type unit that includes an elongate vertically disposed body 56' threadedly engaged into and through a mounting tube 57' in the top of the case 50' and depending into the chamber 51'. A pair of laterally spaced terminal pins 58' depends from the lower end of the body. The vertical position of the body 56' is adjusted to position the terminal pins where the liquid in the chamber contacts and bridges between the pins, or close the circuit therebetween, when the liquid is at and or above said actuating level in the chamber.

To enable vertical adjustment and positioning of the terminal pins suitable sealing means are provided between the body 56' and the mounting tube 57', below the threaded portions thereof, as clearly shown in FIG. 6 of the drawings. Thus, adjustment of the positioning of the pins 58' is effected by threadedly advancing the unit 55' upwardly or downwardly in the tube 57', as desired.

In practice, it has been found that when the switching devices D and D' are first put into operation, that is, when the flow of liquid into and through them is commenced, the liquid tends to turbulate in the chambers of the devices to an extent to adversely effect operation of the switching units therein. More particularly, the switching units are likely to be caused to repeatedly open and close making operation of the devices uncertain and subjecting them and parts of the related systems to unnecessary and possible detrimental work forces. To the above end, the devices D and D' are preferably provided with and include baffle means B and B' to dampen turbulence in the liquid flowing into and through the chambers thereof.

In the first embodiment of my invention, the baffle means B includes an elongate flow tube 60 connected with the inlet fitting of the case 50 and extending into and across the chamber 51 to open toward and direct liquid flowing from it onto a wall of the case in a manner so that turbulation of liquid in the chamber that might occur does not adversely affect operation of the switching unit 55.

In the second embodiment of the invention, the baffle means B' includes a horizontal perforated baffle plate 60' mounted within and extending across the chamber 51 below the switching unit 55 and above the inlet and outlet fittings of the case. The baffle plate 60' substantially eliminates turbulence in the liquid that occurs in the portion of the chamber above it.

It will be apparent that the baffle means B and B' can vary considerably in form and details of construction and that the means B and B' that I have elected to illustrate are but examples of the kinds of baffle means that can be advantageously employed.

When a liquid handling system, in which either the device D or D' is engaged, it is first put into operation and liquid is driven and moved downstream through the unit and into a liquid delivery line to prime or fill that line with the liquid, friction losses and means, such as a mixing head assembly or the like, in the delivery line downstream of the device, work to slow the movement of liquid downstream from the device and/or create a back pressure at or near the outlet of the device. The resulting back pressure and slowed rate of flow of the liquid causes the liquid level in the device to rise more rapidly than it should and causes premature actuation of the control switch unit thereof. The tendency for the rate of flow of liquid from and downstream of the device and resulting premature rise of the liquid level and premature actuating of the switching unit thereof can, in whole or in part, be caused by gases carried by the liquid that become trapped in the delivery line and that tend to blow back or otherwise interfere with the free flow or movement of liquid downstream of the device.

To prevent the above-noted premature actuation of the switch units, the devices D and D' are provided with vent means E and E' that extend between and communicate with the chambers in the devices, above the liquid level therein and the flow passages downstream of the chambers defined by the outlet fittings of the devices or by the delivery lines extending downstream thereof.

In the device D the vent means E includes a vent duct 70 formed in a wall of the case 50 and extending up or vertically from the inner end portion 53' of the outlet fitting 53 to near the top of the case where it communicates with the upper portion of the chamber 51. The inlet fitting 53 is a tubular part formed integrally with the case and has an inlet end portion 53' that extends into the lower portion of the chamber a sufficient distance to allow for the vent duct 70 to communicate with the flow passage defined thereby a suitable distance downstream from the upstream or inlet end thereof and which is sufficient to effect an equalization of pressure on the gas in the chamber 51 with the pressure on the liquid in the flow passage of the outlet fitting. The vent duct 70 is also positioned to communicate with the top of the flow passage in the outlet fitting where gases carried by the liquid accumulates and so that those gases are vented directly to the top of the chamber instead of blowing back into the chamber and adversely affecting the flow of liquid through and from the chamber.

The vent means E noted above were conceived and put into practice to eliminate the tendency for the control switch units of the device D and the device D' (without the vent means) to actuate prematurely during that period of operation when the liquid line and its related systems parts downstream of the device were being filled and primed with liquid and prolonged the priming process and malfunctioning of the system. The vent means has proven to be highly effective to attain its intended end.

In the case of the device D', the vent means E' includes a vent fitting 71 at the upper portion of the case 50' and communicating with the chamber 51' therein; a T-fitting 72 that is shown engaged between the outlet fitting 53' of the case 50' and with which the upstream end of a delivery line can be connected; and a vent duct or line 70' connected with and between the fitting 71 and 72. It will be apparent that the vent means E' is essentially the same as and will function like the vent means E in the device D. An advantage found in the vent means E' resides in the fact that the T-fitting 72 can be moved and connected in the system with which the device D' is related, downstream from the case 50' of the device D'.

It is to be understood that the two forms of vent means E and E' can be varied in details of construction without in any way departing from the broader aspects and spirit of my invention.

When the beverage making and dispensing system in which my device D is incorporated is first set up to be put into operation and the syrup line 11 has yet to be filled or primed, the primer switch P is actuated to effect opening of the syrup valve V and syrup is gas-driven from the tank 30 through the device and thence through the line 11 to the metering means M' and the valve V' of the mixing head assembly H to fill and prime the syrup handling portion of the system for ongoing and regular operation. The device D enables the system to be primed with syrup in a rapid and trouble-free manner. When the system becomes primed with syrup, the control valve of the device D closes automatically, placing the system in full operation. This is readily observed by the operator of the system by the termination of a hissing of gas escaping from the mixing head assembly. At this time, the switch P can be released. In practice, the above priming operation is completed in the least amount of time and in a most efficient and convenient manner.

It is to be noted that in a similar system, without my device D or D' related to it; during that period of time when the system is operated to effect priming the system with syrup, the valves V and V' of the mixing head assembly H open simultaneously and water and the gas in the water and syrup delivery lines commence to flow into and from the mixing cone of the head assembly H. When this occurs, the gas issuing from the assembly H, together with the water, blasts the water out of or from the assembly H in a noisy and oftentimes frightening manner and in a manner that results in broadcasting the water "all over the place" and creating a wet mess. The same events occur when the supply of syrup is exhausted.

When the supply of syrup in the tank 30 is exhausted, the liquid level in the device D is immediately caused to drop or lower by the gas within the chamber and the control switch 55 opens, disabling and putting the system out of operation before gas can advance from the tank 30 into the line 11, to displace or empty the line of syrup.

When the system is disabled, as noted above, the valve 34 of the quick release fitting Q prevents syrup from draining from the line 11.

In practice, that small amount of gas that might advance from the tank 30, through the device D and into the line 11, before the control switch of the device D actuates has proven to be negligible.

In the system illustrated and described above, the device D is shown connected with the downstream end of the (short) flexible syrup hose section 11' and in close proximity to the tank 30. If desired, the device D can be moved further downstream. For example, it can be positioned within the tower T to become, in effect, a part of the head assembly H without adversely affecting operation of the system.

While the devices D and D' here provided were developed and are particularly suited for use in beverage making and dispensing systems and/or machines wherein syrup is moved or driven into and through the systems by motive gas, it has been determined that the devices are equally suitable for use in various other and distinct liquid handling systems wherein the liquids conducted through the devices are moved or driven by various kinds of pumping devices, such as conventional centrifugal pumps, where it is advantageoous to disable and stop the pumps and related electrical equipment when prime is lost and to facilitate priming systems substantially as noted above.

Having described only typical preferred forms and applications of my invention, I do not wish to be limited to the specific details herein set forth but wish to reserve to myself any variations and/or modifications that might appear to those skilled in the art and which fall within the scope of the following claims.

Having described my invention, I claim:

1. A liquid actuating switch device to control the operation of electrically operated devices in response to the presence of a full flow of liquid at an operating pressure in a fluid conducting passage, said switching device includes a case defining an accumulator chamber normally filled with gas with an upper and with a lower portion communicating with upstream and downstream sections of the fluid-conducting passage; and a liquid actuated control switch unit positioned in the chamber to be actuated by a pressurized liquid forcibly moved into and through the chamber rises to an actuating level therein where pressures on the gas in the upper portion of the chamber and on the liquid therein reach substantial equilibrium.

2. The liquid-actuated switch device set forth in claim 1 wherein the control switch unit is a float-actuated switch unit including a body carried by the case and carrying a control switch and a switch actuating float pivotally carried by the body.

3. The liquid-actuated switch device set forth in claim 1 wherein the switch unit is a probe-type switch unit including a body carried by the case and projecting into the upper portion of the chamber and a pair of spaced apart terminal pins projecting from the body to be contacted by the liquid in the chamber to close an electric circuit therebetween when the liquid is at and above said actuating level.

4. The liquid level actuated switch device set forth in claim 1 that further includes vent means extending between and communicating with the upper portion of the chamber and the downstream section of the flow passage, said vent means operates to equalize the pressure on gas in the upper portion of the chamber and the pressure on the liquid in the flow passage downstream of the chamber.

5. The liquid-actuated switch device set forth in claim 1 wherein the control switch unit is a float-actuated switch unit including a body carried by the case and carrying a control switch and a switch actuating float pivotally carried by the body; said device further includes vent means extending between and communicating with the upper portion of the chamber and the downstream section of the flow passage, said vent means operates to equalize the pressure on gas in the upper portion of the chamber and the pressure on the liquid in the flow passage downstream of the chamber.

6. The liquid-actuated switch device set forth in claim 1 wherein the switch unit is a probe-type switch unit including a body carried by the case and projecting into the upper portion of the chamber and a pair of spaced apart terminal pins projecting from the body to be contacted by liquid in the chamber to close an electric circuit therebetween when the liquid in the chamber is at or above said actuating level; said device further includes vent means extending between and communicating with the upper portion of the chamber and the downstream section of the flow passage, said vent means operates to equalize the pressure on gas in the upper portion of the chamber and the pressure on the liquid in the flow passage downstream of the chamber.

7. The liquid level actuated switch device set forth in claim 1 that further includes vent means extending between and communicating with the upper portion of the chamber and the downstream section of the flow passage, said vent means operates to equalize the pressure on gas in the upper portion of the chamber and the pressure on the liquid in the flow passage downstream of the chamber; said vent means includes an elongate tubular outlet part defining an inlet portion of the downstream section of the flow passage and projecting into the lower portion of the chamber and an elongate vent duct connected with and extending upwardly from the inner end portion of the outlet part to open in the upper portion of the chamber.

8. The liquid-actuated switch device set forth in claim 1 wherein the control switch unit is a float-actuated switch unit including a body carried by the case and carrying a control switch and a switch actuating float pivotally carried by the body; said vent means includes an elongate tubular outlet part defining an inlet portion of the downstream section of the flow passage and projecting into the lower portion of the chamber and an elongate vent duct connected with and extending upwardly from the inner end portion of the inlet fitting to open in the upper portion of the chamber.

9. The liquid level actuated switch device set forth in claim 1 that further includes vent means extending between and communicating with the upper portion of the chamber and the downstream section of the flow passage, said vent means operates to equalize the pressure on gas in the upper portion of the chamber and the pressure on the liquid in the flow passage downstream of the chamber; and baffle means in the upper and lower portions of the chamber to reduce turbulence in the chamber adjacent the control switch unit.

10. In combination, a carbonated beverage making and dispensing system including, a carbonated water supply including a carbonator unit connected with and between a water service system and the upstream end of an elongate water supply line, a syrup supply comprising a syrup tank holding a discrete volume of beverage concentrate syrup, an elongate syrup delivery line with upstream and downstream ends, a quick disconnect fitting releasably connecting the upstream end of the syrup supply line with the syrup tank, a motive gas supply delivery motive gas into the syrup tank to drive syrup from that tank through the syrup delivery line, a mixing head assembly including electrically operated normally closed water and syrup valves with outlet sides communicating with a water and syrup mixing and a beverage delivery device, water and syrup flow metering means between the inlet sides of the water and syrup valves and related downstream ends of the water and syrup delivery lines, and electric circuit to supply operating current to the water and syrup valves and including a manually operated dispensing switch that it operable to simultaneously operate and close the water and syrup valves; and, a liquid-actuated switch device engaged in the syrup supply line between the syrup tank and the mixing head assembly to shut off the supply of power to the water and syrup valves when the supply of syrup in the syrup tank has been exhausted and when the pressure on the syrup in the syrup tank drops below a predetermined operating pressure, said switch device includes a case defining a chamber normally filled with gas with upper and lower portions and having liquid inlets and outlets communicating with the lower portion of the chamber through which syrup flowing from the syrup tank to the mixing head assembly is conducted, a normally open liquid actuated control switch unit in the chamber and connected with the electric circuit to normally prevent opening of the water and syrup valves and operating to close and allow opening of those valves when the liquid level in the chamber rises to a predetermined actuating level where the pressures on gas and syrup within the chamber are substantially equalized; and, a manually operable primer switch engaged connected in the circuit and operable to energize and cause the syrup valve to open and cause syrup to flow from the syrup tank to the mixing head assembly until the syrup level in the chamber rises to said actuating level and the pressures on the gas and syrup within the chamber are substantially equalized.

11. The combination set forth in claim 10 wherein the switching device includes vent means communicating between the upper portion of the chamber and with structure downstream of the chamber through which syrup is conducted to maintain substantial equilibrium of pressures on the gas in the chamber and the syrup downstream thereof.

* * * * *